INVENTORS
GEORGE H. STONER
ORLIEN N. BECKER
BY HARRY LEVINSON
ATTORNEYS

Jan. 20, 1953  G. H. STONER ET AL  2,626,366
DIRECT CURRENT ELECTRIC MOTOR
Filed April 14, 1951  2 SHEETS—SHEET 2

INVENTORS
GEORGE H. STONER
ORLIEN N. BECKER
BY  HARRY LEVINSON

ATTORNEYS

Patented Jan. 20, 1953

2,626,366

UNITED STATES PATENT OFFICE 2,626,366

DIRECT-CURRENT ELECTRIC MOTOR

George H. Stoner, Seattle, Wash., Orlien N. Becker, Cambridge, Mass., and Harry Levinson, Seattle, Wash., assignors to Boeing Airplane Company, Seattle, Wash., a corporation of Delaware Application April 14, 1951, Serial No. 221,002

9 Claims. (Cl. 310—114)

This invention relates to direct-current electric motors of the continuous rotating reversible type, and more particularly to one of improved operating characteristics especially suited for use in servomechanisms, or generally in applications in which highly rapid mechanical response of the motor to changes in control voltage is desired. Use of the term "continuous rotating" is intended to distinguish the type of motor herein contemplated from step-by-step or successive-incremental rotating types, the two being unrelated in function and application. The invention is herein illustratively described in a typical embodiment of its presently preferred form, and by reference to the problems of aircraft servomechanism applications, but it will be understood that the particular form and constructional details of the motor may vary in accordance with preference or design requirements without necessarily departing from the essential features of the invention as set forth in this description and pointed out thereafter in the appended claims.

In many of the applications of electric motors to aircraft servomechanisms the critical problem has been to attain the necessary high-torque and continuous high load rating in a drive motor unit of acceptably low weight and small size. Because of the difficulty in resolving these conflicting requirements, a frequently used expedient for obtaining quick starts and reversals in such applications has been to employ continuously running electric motors of conventional aircraft design with control clutches interposed between such motors and the loads being served, such as bomb bay door actuators, jack screw actuators, etc. However, such clutch mechanisms added weight and increased the problems of installation and maintenance. Moreover, in the case of such heavy duty applications as a servo-controlled gun turret or the like, for example, overheating of the servomechanism electric motor, as during prolonged continuous battle duty operation, would likely occur unless, by a combination of efficient cooling and utilization of heavy copper conductors in both armature and field windings, the necessary continuous high load rating of the motor were provided. The difficulty with that expedient, however, is that not only does the additional copper increase the weight of the motor and thereby add undesirably to the total tare load of the airplane, but the resulting increased armature inertia further decreases the capability of the motor to respond rapidly to starting and reversing control voltages.

An object of the present invention is a direct-current motor of the continuous rotating reversible type, providing substantially increased useful power relative to the weight of the motor, by comparison with earlier or conventional types of electric motors whether for servomechanism applications or otherwise. Moreover, the invention provides a motor with relatively high continuous load rating through efficient conversion of magnetizing force into torque-producing fields and special adaptation to more efficient and complete cooling of the motor windings.

Still another object is a direct-current reversible electric motor of continuous high torque rating and relatively low rotor inertia, providing quick starting and reversibility, such that the use of clutches or the like may be eliminated in many applications in which they were previously necessarily, for example.

A related purpose is a motor in which full operating control may be centered in a single control circuit, the instantaneous direction of rotation and torque magnitude of the motor being dependent on polarity and magnitude, respectively, of a control voltage applied in such circuit, and with no necessity for any mechanical shifting of commutator brushes or the like to effect reversal of the motor, as in earlier types.

With these objects and the general problem in view, important features of the invention defined in terms of the preferred and herein illustrated form thereof reside in the combination of an annular outer field structure, an inner cylindrical ferromagnetic core structure spaced radially inward from said outer field structure to define a thin cylindrical air gap, and a hollow segmental-cylindrical rotor armature of ferromagnetic material occupying said air gap and journaled for rotation continuously around such air gap. The segmental-cylindrical rotor armature preferably comprises two oppositely disposed 90-degree arcuate segments of radially thin cross section, hence of very low inertia, and fixed upon a common journal support for angular movement enslaved to a resultant magnetic field produced by the field structure and passing diametrically through the air gap and cylindrical core structure. It has been found that the torque which can be generated with such a thin steel web rotor element subjected to the magnetic field can be made comparable to that produced in conventional wound-armature direct-current motors, but the inertia of the rotor in the present case is only a small fraction of that in the conventional motor.

The inner core structure completing the low-reluctance path for the resultant magnetic field comprises an effective part of the motor stator structure. Such core structure is preferably of laminated construction and for mechanical reasons explained later herein, is preferably journaled on the motor shaft to "float" or idle relative to such shaft.

Further important features of the invention reside in the arrangement for producing the magnetic field acting on the ferromagnetic rotor and rotatable in one direction or the other depending on the mode of energization. In the preferred and herein illustrated form of the motor two separate and electrically independent stator field windings are used, one energized through one set of commutator brushes and cooperating commutator, and the other through a separate set of commutator brushes positioned effectively at right angles to the first set, and cooperating commutator, whereby direction of rotation of the resultant field, hence of motor torque, may be reversed simply by reversing the direction of current flow in one of the windings while maintaining constant polarity of energization of the other such winding. In this form of the motor the constantly energized or "reference" winding, as it is termed herein, is energized preferably from a constant-current source which maintains constant excitation of the winding despite the generation of a back-E. M. F. therein which varies in proportion to motor speed, whereas the variably energized control or "signal" winding of the motor may be energized from any suitable control source, the output polarity of which may be reversed in order to reverse the direction of motor rotation.

When only one of the field windings, such as the reference winding, is energized the motor field exerts a braking or holding action on the rotor, the rotor segments tending to remain centered with such field. However, when the signal field winding is energized, as, for instance to produce a magnetomotive force approximately equal to the reference field magnetomotive force, the resultant magnetic field shifts in that case to one edge or the other of the rotor segments. The rotor segments are then drawn toward alignment with the resultant field. As they move in that direction such field is shifted by commutation ahead of the rotor, and the result is continuous rotation in a direction dependent on the polarity of energization of the control field relative to the reference field.

These and other features, objects and advantages of the invention including certain details of the preferred form thereof will now become more fully evident from the following description based on the accompanying drawings.

Figure 1:
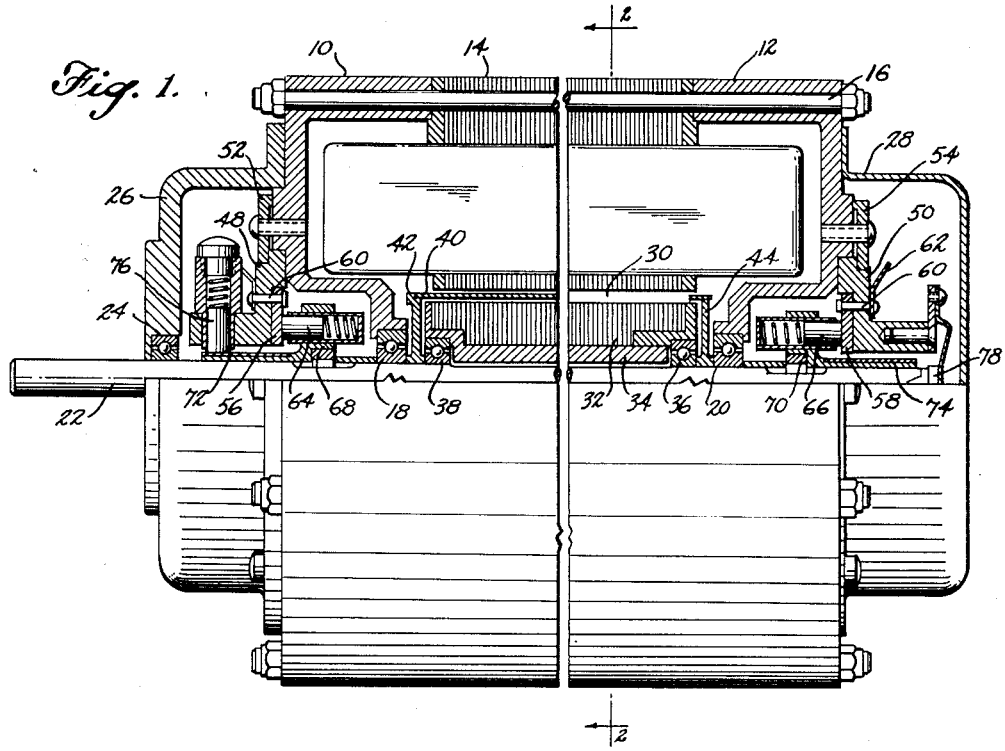
Figure 1 is a side view with the upper left-hand portion of the view being taken sectionally on line 1a—1a in Figure 2, and the upper right-hand portion of the view being taken sectionally on line 1b—1b in Figure 2.

As shown, the motor frame or housing comprises the spaced annular frame sections 10 and 12, between which the stacked ferromagnetic disks forming the annular outer field structure 14 are clamped and held by through-bolts 16. The magnetic field lamination disks are provided with slots or notches between salient poles 19, twelve in number in the illustrative case, to receive the field windings R and S as shown. Antifriction bearings 18 and 20 carried by the frame sections 10 and 12, respectively, provide rotational support for the motor shaft 22. Additional journaling support for the shaft is provided by antifriction bearing 24 carried by the end cover plate 26 bolted to the frame and section 10. An opposite end cover plate 28 is similarly bolted to the opposite frame end section 12.

The central cylindrical core structure cooperating with the annular field structure 14 to complete the magnetic circuit through the intervening thin annular air gap 30 comprises the stacked ferromagnetic disk laminations 32 assembled on the two-piece ferromagnetic spool 34. Preferably this spool is journaled on the steel motor shaft 22 by antifriction bearings 36, 38 to "float" or idle freely on such shaft during rotor rotation. This solid cylindrical core structure forms no part of the rotor proper and because of the very low bearing friction has negligible effect upon inertia thereof.

Figure 2:
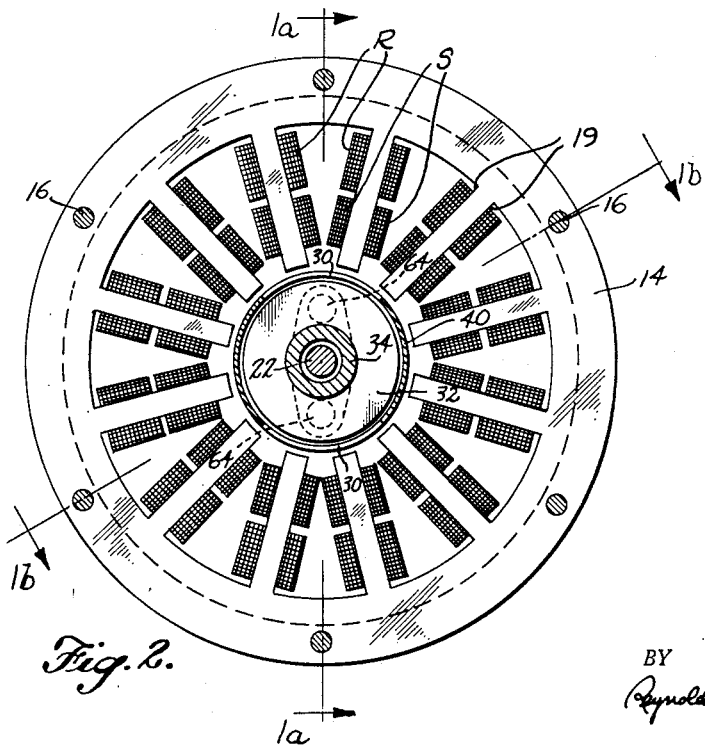
Figure 2 is a transverse section taken on line 2—2 in Figure 1.
Figure 3:
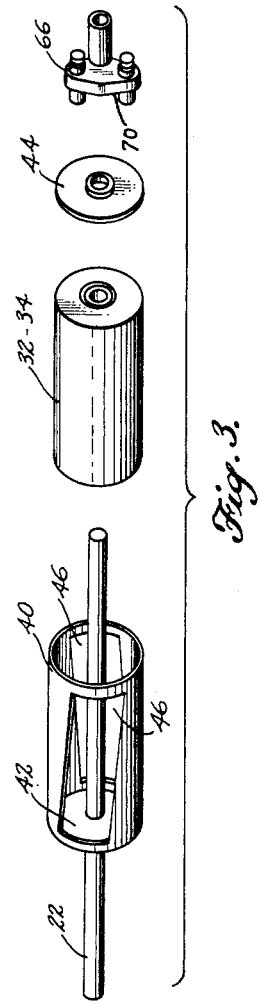
Figure 3 is an exploded isometric view of the rotor and other elements forming part of the shaft assemblage.

The armature element proper by which magnetic interaction with the stator field produces motor torque forces and rotation comprises the hollow segmental-cylindrical ferromagnetic element 40 supported in air gap 30 by shaft-mounted nonmagnetic end disks 42 and 44 for rotation continuously around such gap. Such end plates 42 and 44 are suitably keyed to shaft 22 at locations between the ends of the core structure 32, 34 and the shaft journals carried by the frame sections 10 and 12, respectively, as shown. As shown in Figures 2 and 3, the thin arcuately spaced rotor segments 40' are conformed to the annular air gap 30 which they occupy except for suitable radial clearance spaces and the arcuately-shaped openings 46 between segments. Such segments and openings occupy each approximately 90 degrees of gap circumference as shown. The opposite longitudinal edges of the respective rotor segments are slightly skewed in order to eliminate any tendency for the rotor to lock in positions of registry with field structure winding slot locations during application of a resultant magnetic field disaligned with relation to segments 40', as will later appear.

Annular commutator supports 48 and 50 of suitable insulating material are mounted by screw-attached clamping rings 52 and 54, respectively, to the frame and sections 10 and 12. Individual commutator segment rings 56 and 58 are attached as by rivets 60 to the inner faces of the respective insulating members 48 and 50 in planes at right angles to the shaft axis. Commutator segment connecting lugs 62 are held by such rivets on the opposite or outer faces of such insulating members. These connecting lugs are suitably electrically connected to terminals of the motor field winding sections as will later appear, although for convenience the wiring is omitted from Figures 1 and 2.

Sets of commutator brushes 64 and 66 mounted for rotation upon motor shaft 22 engage the respective commutators 56 and 58 as shown. These commutator brush sets are disposed effectively in mutually right-angle related axial planes. The brush rigging comprises the individual insulating collars 68 and 70 keyed to the motor shaft and having brush-supporting radial arms. Axial extensions of these insulating collars carry slip rings 72 and 74, respectively, which are engaged by slip ring brushes 76 and are suitably connected to provide continuous electrical connections to the corresponding commutator brushes. Two oppositely disposed slip ring brushes engaging each of the slip rings are carried by each of the insulating members 48 and 50, respectively, for convenience in making electrical connections inside the motor housing, althought one such slip ring brush for each slip ring would otherwise suffice. One of the two commutator brushes of each set is grounded to the motor shaft, the end of which in turn is slidably engaged by a grounding brush 78, spring-supported from the fixed insulating member 50 as shown.

In the preferred form of the motor the two separate field windings R and S, representing the reference winding and signal or control winding, respectively, are each of the simplex progressive lap type having coil sections wound in the same field structure slots and similarly connected to corresponding segments of the respective commutators. The resulting magnetic field circuit has twlve pole sections with the coil section end connections jumping three pole pitches between successive sections, as indicated schematically in Figures 4 and 5. The windings are so energized that each winding produces two magnetic poles 180 degrees apart, the direction of alignment of such poles being dependent on the angular position of the corresponding set of commutator brushes.

Figure 4:
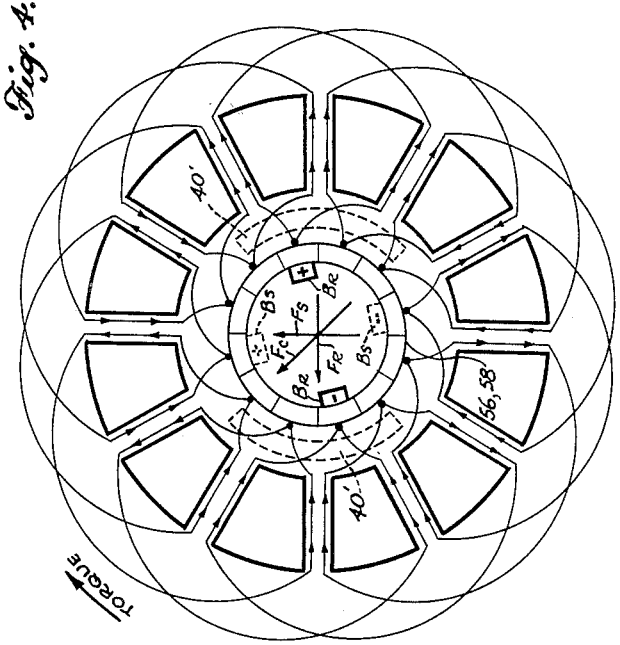
Figures 4 and 5 are functional diagrams illustrating typical field winding connections and the effect of field excitation on direction of the rotation.

In Figure 4, for example, it is assumed that the opposed brushes $B_R$ engage one commutator ring suitably connected to the coil sections of the reference field winding and that the alternate set of brushes $B_S$ in right angle relationship to the first set engage the other commutator ring suitably connected to the sections of the signal or control field winding S, although but a single commutator is shown schematically in the figure. With such an arrangement and in the relative positions of the brushes shown in the figure the component of field produced by flow of energizing current through the reference winding is represented by the vector $F_R$, the component of field produced by energizing current flowing in the signal winding by the vector $F_S$ and, in the illustrative case of equal magnetomotive forces produced by the respective windings, the resultant field by the vector $F_C$.

It will be noted that the reference field vector $F_R$ is centered in relation to the rotor segments 40', a relationship which remains fixed because of the fixed relationship between the rotor segments and the reference field commutator brushes $B_R$ in all positions of rotation of the motor armature. Likewise the signal or control field vector $F_S$ remains fixed at right angles relative to the plane of symmetry of the rotor segments 40', as shown, for a similar reason. Consequently, with equal magnetomotive forces produced by the respective energized field windings, as illustrated, the resultant vector $F_C$ will lie along longitudinal edges of the rotor segments as shown. Under this condition the rotor in Figure 4 will be subjected to clockwise torque as a result of its tendency to seek alignment with the resultant magnetic field passing diametrically through the central core and air gap of the motor. However, as the rotor segments move toward alignment with the resultant field, the commutator brushes likewise move at the same rate and in the same direction, so that the resultant field is shifted constantly ahead of the rotor segments and remains at the leading edge of such segments as rotation continues in the same direction as a result of commutator action. Such rotation continues in the same direction as long as the polarity of energization of the signal field winding remains unchanged in relation to that of the reference field winding.

Figure 5:
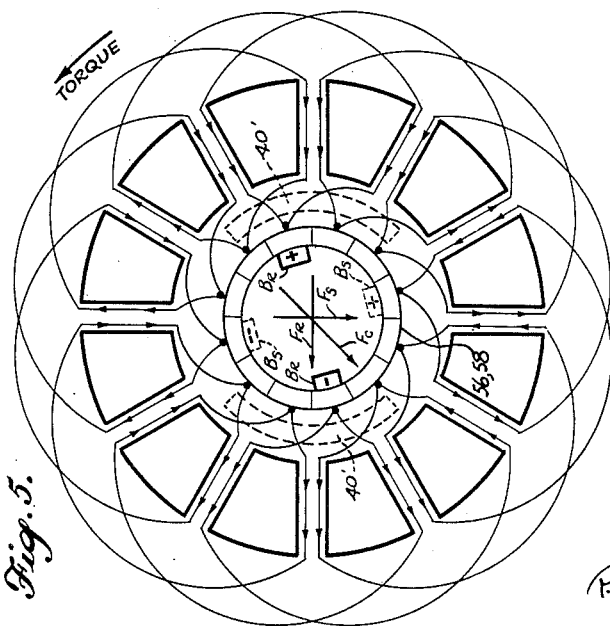

By reversing the relative polarity of the signal winding commutator brushes $B_S$ as shown in Figure 5, the resultant field $F_C$ in that case becomes located at the opposite longitudinal edges of the rotor segments and reverse torque is generated as shown by the reversed torque arrow.

If energizing current in one of the windings such as the signal winding is reduced to zero, no torque is generated. In that case, the reference field vector $F_R$ passing centrally through the rotor segments provides a "clamping" or holding force which tends to lock the rotor in stationary position against externally applied displacing torques, which is a desirable feature in certain applications.

It will also be observed that the angular location of the resultant field vector $F_C$ with relation to the rotor segments depends not only upon relative brush positions, which are fixed in relation to the rotor segments, but also directly upon the relative magnitudes of the magnetomotive forces produced by the respective field windings R and S. If, for example, the magnetization produced by the signal winding is less than that produced by the reference winding, the resultant magnetic vector $F_C$ will not lie precisely at the 45-degree position or at corresponding longitudinal edges of the rotor segments but at some intermediate position between such edges and the plane of symmetry of such rotor segments. In that event the resultant rotor torque will be less than in the case of a signal field magnetomotive force increased to a value equal to that of the same reference field. Consequently not only is the direction of motor torque dependent upon polarity of energizing voltage applied to the signal field winding, but the magnitude of such torque is directly dependent upon the magnitude of energizing current flowing in such signal field winding.

Motion of the ferromagnetic segments in the air gap beneath field structure poles produces varying reluctance, and thus varying flux, in the magnetic paths through these poles; and voltages are thereby generated in the linked reference and signal windings. These voltages occur in such direction as to oppose energizing current flow, and are thus completely analogous to the back-E. M. F. in the armature winding of a conventional wound armature D. C. motor. Because of this phenomenon it will usually be preferable in servomotor applications of the present invention to energize the reference field winding R from a constant-current source, namely a regulated source which produces constant load current independent of fluctuations in load impedance. By so doing the torque of the motor will not be materially lessened at high speeds as a result of the increased back-E. M. F. in proportion to speed. If desired, a similar type of energizing source for the signal field winding may also be employed if adjustable as to current magnitude and polarity of output voltage in order to obtain varying torque in either direction of motor rotation.

It will be evident that the reason for employing two separate commutator rings engaged by the respective sets of brushes, one for each field winding, instead of a single commutator ring, is to permit the use of electrically independent field windings whereby the energizing sources for each winding may each be referred to ground. Furthermore, it will be apparent that the use of two sets of brushes disposed in right-angular relationship for energizing the separate motor windings enables reversing the direction of rotation of the motor simply by reversing the polarity of the applied voltage at one set of brushes with relation to the other set, and that no mechanical shifting of commutator brushes is necessary in order to obtain a reversal of rotation as in various prior types of electric motors.

It will likewise be evident that in connection with the two-segment rotor form of the motor as herein illustrated the use of 90-degree circumferential-width rotor segments in conjunction with a 90-degree angle between effective brush planes, to produce field components aligned with segments 40' and at right angles thereto, respectively, enables deriving equal torque in both directions, which torque will be maximum in the optimum case of equal energizing currents of rated maximum value flowing in the two windings. However, a decrease or increase in the arcuate length of the rotor segments is theoretically possible although not desirable. Similar considerations govern the choice of angle between the effective commutator brush planes and between the plane of one set and the plane of symmetry of the segmental-cylindrical rotor. Brush arrangements different from that shown in the drawings, unless producing the equivalent energization pattern of the respective field windings, will not provide equal torque in both directions, nor maximum torque.

While it is possible theoretically to reverse the relative positions of the symmetrical magnetic core structure 32, 34 and the outer annular field structure containing the field windings, there are important reasons for utilizing the illustrated form over such a reversed form. One of the main reasons for the arrangement shown is the excellent adaptation of the motor to forced air cooling because all of the windings in the motor can be located in direct physical contact with the housing or shell structure, from which the heat generated in the windings is easily removed by forced air circulation around the relatively large surface area of the housing. The cooling efficiency is thereby much greater than in motors having wound rotors from which heat must be dissipated by convection or radiation from the rotor around which circulation of cooling air is restricted. This feature permits a relatively high continuous load rating.

Although the invention is illustrated in a form employing two 90-degree rotor segments and, correspondingly, two brushes per commutator, it will be obvious to those skilled in the art of motor design generally that the same basic principles applicable to this form also apply to designs incorporating larger even numbers of rotor segments, with corresponding numbers of brushes per commutator. In any case, however, the total angle subtended by all of the rotor segments preferably will be 180 degrees as mentioned previously. Moreover, the arrangement of field windings illustrated is not necessarily the only arrangement possible for producing the desired field components, one of which is reversible in order to reverse the direction of motor torque. It will also be seen that in cases requiring only a limited angle of reversible rotation, both field windings may be energized without necessity of commutation.

The advantage of a central core structure 32, 34 which is journaled to "float" or idle freely on the rotor shaft, as illustrated, over an equivalent core structure fixedly mounted at one end on one frame end section and projecting into the hollow of the segmental-cylindrical rotor 40, is that the arrangement illustrated enables the use of small shaft bearings for the rotor whereas in the alternative case a larger-diameter bearing would be required at one end of the rotor in order to encircle the fixed supporting base of any such fixed core structure, and thereby increase the armature inertia, and yet such an alternative arrangement might in some instances be preferred over that shown in the drawings. It is a comparatively simply change and for that reason no separate illustration of the alternative form is shown.

We claim as our invention:

1. The direct-current electric motor comprising magnetic field circuit stator means comprising an annular outer portion and an inner core portion spaced inwardly from said outer portion by a short distance to define an annular air gap therebetween, stator field sectionalized winding means and commutator means having segments connected to sections of said field winding means for energization of said field winding means to produce an effectively diametrical magnetic field extending through said air gap and said core portion, motor shaft means, rotor means having segmental-cylindrical ferromagnetic armature means extending arcuately in said air gap and supported by said shaft means for rotation continuously around said air gap, and commutator brush means carried rotatively by said shaft means in fixed angular relation to said rotor armature means and cooperating with said commutator means to direct field-energizing current through said winding means sections in a pattern establishing said magnetic field in disalignment with relation to said rotor means segmental-cylindrical armature means, said established magnetic field rotating with said brush means continuously ahead of alignment with said armature means as the latter is drawn continuously toward alignment with such rotating magnetic field.

2. The direct-current electric motor defined in claim 1, wherein the field winding means comprises field coils wound on the annular outer portion of the magnetic field stator means, said outer portion being slotted to receive such coils, and the armature means comprises oppositely disposed cylindrical segments which are relatively thin in relation to their circumferential width and radius.

3. The direct-current electric motor defined in cliam 2, wherein the segments have longitudinal edges which are skewed in relation to longitudinal field winding slots or openings in the magnetic field stator outer portion receiving the field coils.

4. The direct-current electric motor defined in claim 1, wherein the armature means comprises oppositely disposed cylindrical segments of substantially equal arcuate width and wherein the commutator brush means comprises two sets of commutator brushes, one set being effectively positioned with relation to such cylindrical segments to produce a field component aligned therewith and the other set being effectively positioned relative to said segments to produce a field component at a substantial angle with relation thereto, such that a resultant magnetic field is produced in disalignment with the cylindrical segments in a sense dependent on the polarity of energizing voltage applied to the second mentioned brush set in relation to that applied to the other brush set.

5. The direct-current electric motor defined in claim 4, wherein the segments are two in number and the circumferential width of the segments is substantially equal to 90 degrees and the angulare separation between the field components produced by the respective brush sets is substantially equal to 90 degrees.

6. The direct-current electric motor defined in claim 5, wherein the field winding means comprises two electrically independent similar field windings and wherein the commutator means comprises two separate commutators operatively connected to such independent windings, respectively, and each operatively engaged by one of the brush sets.

7. The direct-current electric motor defined in claim 6, wherein the field windings are both wound on the outer portion of the magnetic field stator means and wherein the inner portion of such stator means comprises a symmetrical cylindrical core.

8. The direct-current electric motor defined in claim 7, wherein the cylindrical core is journaled on the motor shaft within the segmental-cylindrical armature means for idle rotation thereof on such shaft.

9. The reversible electric motor comprising magnetic field stator means having an annular outer portion and an inner core portion spaced inwardly from said outer portion by a short distance to define an annular air gap therebetween, a motor shaft journalled centrally in relation to said stator means, field winding means comprising two separate windings and connections therefor to produce separate components of field extending diametrically through said air gap at a relative angle, and armature means comprising a ferromagnetic cylindrical-segmental rotor element mounted for rotation on such shaft and having thin circumferential segments received in said air gap and drawn toward alignment with the resultant magnetic field produced by energizing current directed through said field windings.

GEORGE H. STONER.
ORLIEN N. BECKER.
HARRY LEVINSON.

REFERENCES CITED

The following references are of record in the file of this patent:

UNITED STATES PATENTS

| Number | Name | Date |
|---|---|---|
| 1,949,910 | Heckler | Mar. 6, 1934 |
| 2,194,211 | Sansom | Mar. 19, 1940 |
| 2,391,005 | Bryan | Dec. 18, 1945 |
| 2,492,678 | Amtsberg | Dec. 27, 1949 |